United States Patent
Link et al.

(10) Patent No.: US 7,654,066 B2
(45) Date of Patent: Feb. 2, 2010

(54) SHIFT MECHANISM FOR TRIM MOWER CUTTING UNITS

(75) Inventors: Todd Allen Link, Apex, NC (US); Jeffrey David Witwer, Clayton, NC (US); Jason Mclamb Honeycutt, Dunn, NC (US); Brian Keith Pearman, Apex, NC (US); Ronald Lee Reichen, Raleigh, NC (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/208,566

(22) Filed: Sep. 11, 2008

(65) Prior Publication Data
US 2009/0007535 A1    Jan. 8, 2009

Related U.S. Application Data

(62) Division of application No. 11/676,087, filed on Feb. 16, 2007, now Pat. No. 7,437,864.

(51) Int. Cl.
A01D 34/00 (2006.01)
(52) U.S. Cl. ........................................ 56/15.5
(58) Field of Classification Search ................. 91/520; 56/15.5, 15.6, 6, 7, 14.7, 14.9, 15.2, 15.3, 56/10.9, 10.4; 172/79, 305, 482
See application file for complete search history.

(56) References Cited

U.S. PATENT DOCUMENTS

| | | | | |
|---|---|---|---|---|
| 2,882,978 A * | 4/1959 | Smith et al. | ................... | 172/79 |
| 3,090,184 A | 5/1963 | Hadek | | |
| 3,949,539 A * | 4/1976 | Cartner | ................... | 56/10.4 |
| 4,206,580 A | 6/1980 | Truax et al. | | |
| 4,244,597 A * | 1/1981 | Dandl | ................... | 280/473 |
| 4,426,829 A * | 1/1984 | Johnson | ................... | 56/15.5 |
| 4,866,917 A | 9/1989 | Phillips et al. | | |
| 4,873,818 A | 10/1989 | Turner | | |
| 4,893,456 A | 1/1990 | Wallace | | |
| 4,901,508 A | 2/1990 | Whatley | | |
| 5,042,236 A | 8/1991 | Lamusga et al. | | |
| RE34,921 E | 5/1995 | Lamusga et al. | | |
| 5,483,789 A | 1/1996 | Gummerson | | |
| 5,623,817 A | 4/1997 | Bricko et al. | | |
| 5,832,706 A * | 11/1998 | Edwards | ................... | 56/15.2 |
| 6,032,441 A | 3/2000 | Gust et al. | | |
| 6,044,631 A | 4/2000 | Anderson et al. | | |
| 6,230,089 B1 * | 5/2001 | Lonn et al. | ................... | 701/48 |
| 6,351,929 B1 | 3/2002 | Gust et al. | | |
| 6,412,258 B1 | 7/2002 | Doerflinger | | |

(Continued)

FOREIGN PATENT DOCUMENTS

EP    1405556 A2 *    4/2004

(Continued)

*Primary Examiner*—Árpád Fábián-Kovács

(57) ABSTRACT

A shift mechanism for trim mower cutting units includes a pair of slidable carriers. Each slidable carrier can slide along a pair of guide rods mounted to a mower frame. A hydraulic extension cylinder is connected to each slidable carrier and independently extends to move the slidable carrier laterally outward from the mower frame or retracts to move the slidable carrier laterally inward in relation to the mower frame. A hydraulic shifting cylinder is mounted between the two extension cylinders and extends to shift both slidable carriers laterally inward toward a center position, and retracts to move both slidable carriers laterally outward toward an extended position.

4 Claims, 4 Drawing Sheets

U.S. PATENT DOCUMENTS

| | | |
|---|---|---|
| 6,484,481 B1 | 11/2002 | Langworthy et al. |
| 6,698,170 B2 | 3/2004 | Tironi |
| 6,698,171 B2 | 3/2004 | Doerflinger |
| 7,415,919 B2 * | 8/2008 | Link et al. .................... 91/520 |
| 2007/0137159 A1 * | 6/2007 | Reichen et al. ................. 56/7 |

FOREIGN PATENT DOCUMENTS

| | | |
|---|---|---|
| EP | 1457104 | 1/2007 |
| GB | 2331221 | 5/1999 |

\* cited by examiner

SHIFT MECHANISM FOR TRIM MOWER CUTTING UNITS

This is a divisional application and claims priority based on U.S. application Ser. No. 11/676,087, filed Feb. 16, 2007 now U.S. Pat. No. 7,437,864, and entitled, SHIFT MECHANISM FOR TRIM MOWER CUTTING UNITS under 35 U.S.C. 120.

This invention relates generally to grass mowing machines, and particularly to trim mowers used to cut grass on small or enclosed rough and fringe areas, and around bunkers and sand traps of golf courses.

BACKGROUND OF THE INVENTION

Field of the Invention

Trim mowers, also sometimes referred to as utility mowers, may be used to mow the smaller and/or enclosed rough and fringe areas on golf courses. These areas may require a trim mower having a relatively narrow cut width because the areas may include undulating terrain, or may be too small or confined for larger mowing machines. Trim mowers may include three cutting units powered by and attached to a traction vehicle. For example, two front cutting units may be positioned forward of the vehicle's front pair of wheels, and a rear cutting unit may be between the front wheels and a single rear wheel used for steering. The rear cutting unit may cut a swath between the two front cutting units that overlaps the swaths cut by the two front cutting units.

Trim mowers have a tendency to "crab" when operated on side slopes that have relatively steep inclines or undulations that are common on many golf courses. Crabbing refers to the rear wheel tracking or sliding downhill from the centerline of the trim mower. Crabbing may cause the trim mower to leave uncut strips of grass. This occurs when the rear cutting unit tracks or slides downhill so much that it no longer can overlap the two front cutting units.

To prevent or minimize uncut strips, trim mowers may be designed with additional overlap between the front and rear cutting units. However, greater overlap also can reduce a trim mower's cutting width, resulting in lower productivity of the trim mower in flatter areas. A trim mower is needed having high versatility, and that will prevent or minimize uncut strips without sacrificing productivity.

When trim mowers are used to cut grass at or near the edge of a golf course hazard such as a sand trap or bunker, or other golf course feature, the machine's weight may cause the bunker wall to collapse, especially in sandy soil conditions. Additionally, a trim mower weighing 1000 pounds or more may slide into a sand trap or bunker, get stuck, become high centered, or experience reduced stability. A trim mower is needed that will reduce the risk of damage to golf course features such as sand traps or bunkers. A trim mower is needed that will maintain stability and minimize the risk of sliding into a sand trap or bunker, becoming high centered or stuck.

Efforts have been made to design and make trim mowers that solve one or more of these problems. For example, U.S. Pat. Nos. 6,032,441 and 6,351,929 relate to a triplex trim mower with a pair of laterally adjustable cutting units. The cutting units are supported by a lateral carrier frame which is slidably engaged to a lateral support frame. A hydraulic cylinder permits the carrier frame to be laterally displaced with respect to the vehicle frame to reach the edge of a bunker or sand trap while the machine maintains a distance from that feature. When trimming around an obstacle on a slope with the cutting units shifted to the downhill side, the trim mower may experience reduced stability because all cutting units are shifted by a single carrier which supports its own weight along with weight of the cylinders and lift arms. When this weight and the cutting units are shifted to the downhill side, the center of gravity of the machine is moved into a less favorable position that can lead to reduced stability. If both cutting units are shifted to one side of the machine with the single carrier frame, the opposite side tire may roll on uncut turf, resulting in poor cut quality and an unsightly cut pattern.

A shift mechanism for a trim mower cutting units is needed that minimizes the reduction of stability when one or more cutting units are shifted and extended outwardly, especially while the machine is on steep slopes. A shift mechanism is needed that will minimize the shift in the vehicle's center of gravity if one or more cutting units are extended outwardly. A shift mechanism is needed that will not cause the uphill tire to roll on uncut turf, and that will help a trim mower achieve a better cut quality and cut pattern.

Shift mechanisms have been proposed to move cutting units laterally outwardly. For example, U.S. Pat. No. 2,882,978 relates to a selectably slidable, laterally offset mower for trimming beneath overhanging obstacles such as low tree branches. U.S. Pat. No. 4,873,818 relates to a similar mower that provides increased offset capability. U.S. Pat. Nos. 4,893,456 and 5,483,789 relate to single cutting decks that can be laterally displaced from a conventional centered position to a laterally extended position. These devices are not well suited and have not been adapted for use on trim mowers that are used to cut rough and fringe areas on a golf course.

A shift mechanism for a trim mower is needed that allows a cutting unit to reach and mow grass in small or enclosed areas of golf courses, especially around the edges of hazards such as sand traps and bunkers, but that will not sacrifice productivity when mowing other areas. A shift mechanism for a trim mower is needed that is capable of increasing the mower's cutting width, or increasing the overlap between front and rear cutting units. A shift mechanism for a trim mower is needed that helps the vehicle maintain stability when mowing on side hills, or if a cutting unit is moved laterally. A shift mechanism is needed that can reduce the risk of damage to the edges of sand traps and bunkers.

SUMMARY OF THE INVENTION

A shift mechanism is provided for trim mower cutting units, that allows each cutting unit to mow grass in small or enclosed areas of golf courses, especially around the edges of hazards such as sand traps and bunkers, but that will not sacrifice productivity when mowing other areas. The shift mechanism is capable of increasing the mower's cutting width, or increasing the overlap between front and rear cutting units. The shift mechanism also helps reduce the loss of vehicle stability when mowing on side hills or hazards while a cutting unit is moved laterally. The shift mechanism can reduce the risk of damage to the edges of sand traps and bunkers.

The shift mechanism includes a pair of slidable carriers. Each slidable carrier can slide along a pair of guide rods mounted to a mower frame. A hydraulic extension cylinders is connected to each of the slidable carriers and independently extends to move the slidable carrier laterally outward from the mower frame or retracts to move the slidable carrier laterally inward in relation to the mower frame. A hydraulic shifting cylinder is mounted between the two extension cylinders and extends to shift both slidable carriers laterally inward toward a center position, and retracts to move both slidable carriers laterally outward toward an extended position.

DESCRIPTION OF THE PREFERRED EMBODIMENT

Figure 1:
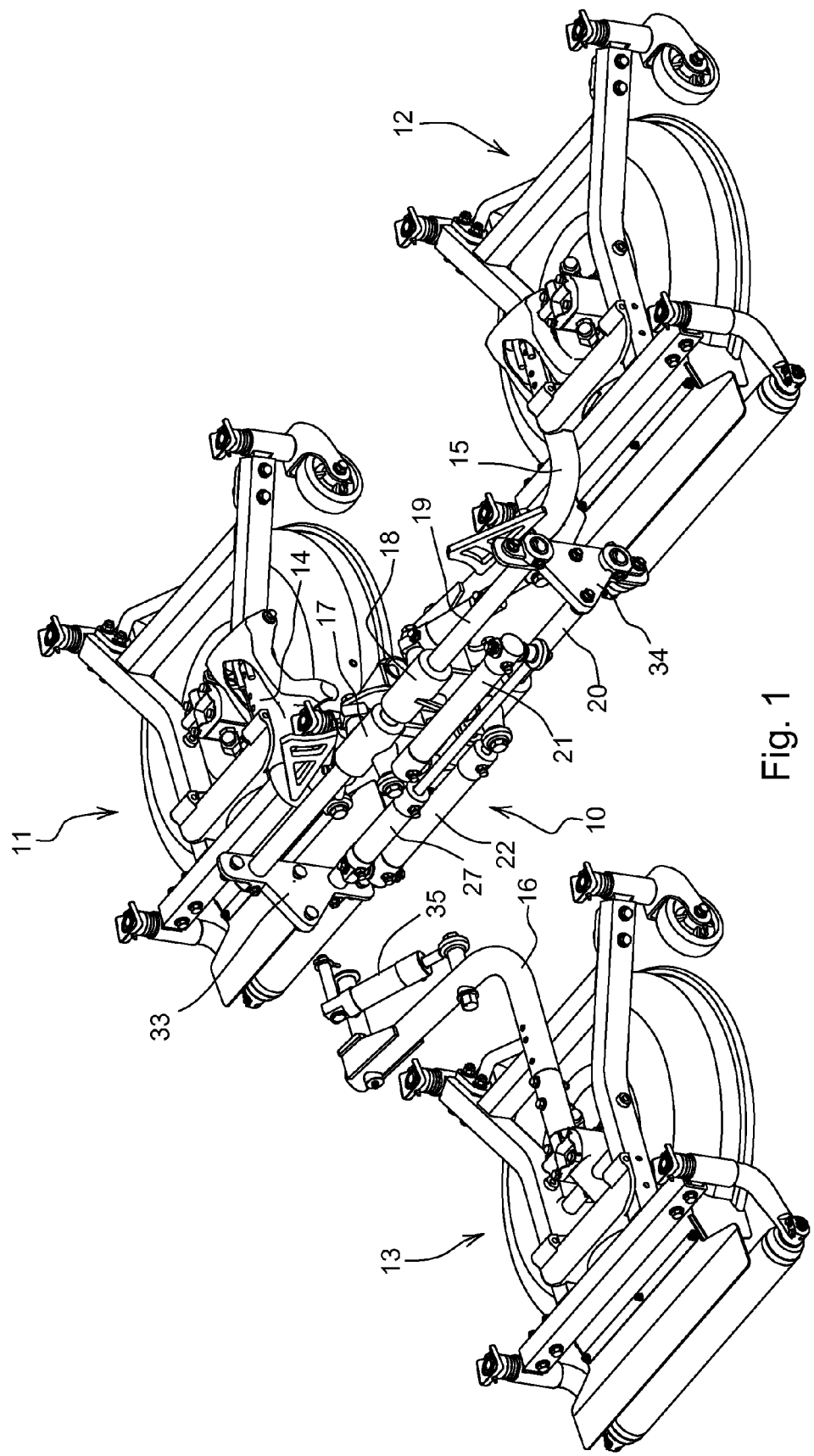
FIG. 1 is a rear perspective view of cutting units that may be used on a trim mower having a shift mechanism for trim mower cutting units in a first embodiment of the invention.
Figure 2:
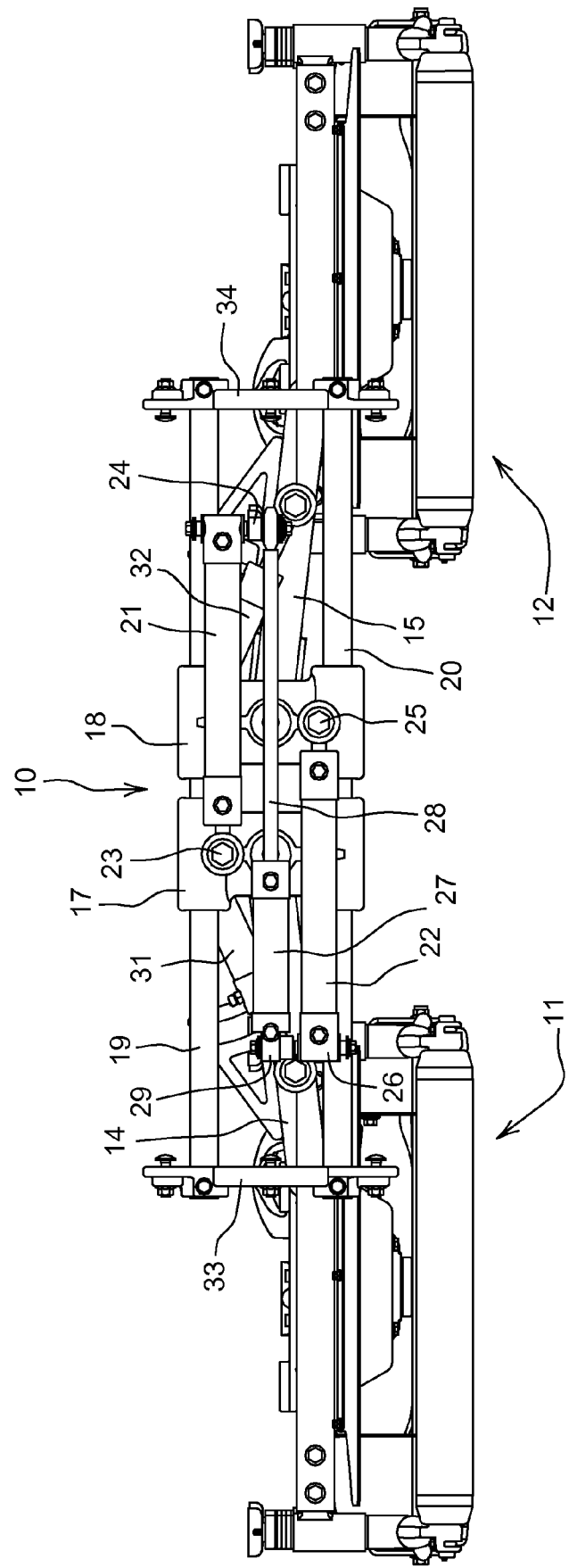
FIG. 2 is a rear view of view of a shift mechanism for trim mower cutting units in a first embodiment of the invention.
Figure 3:
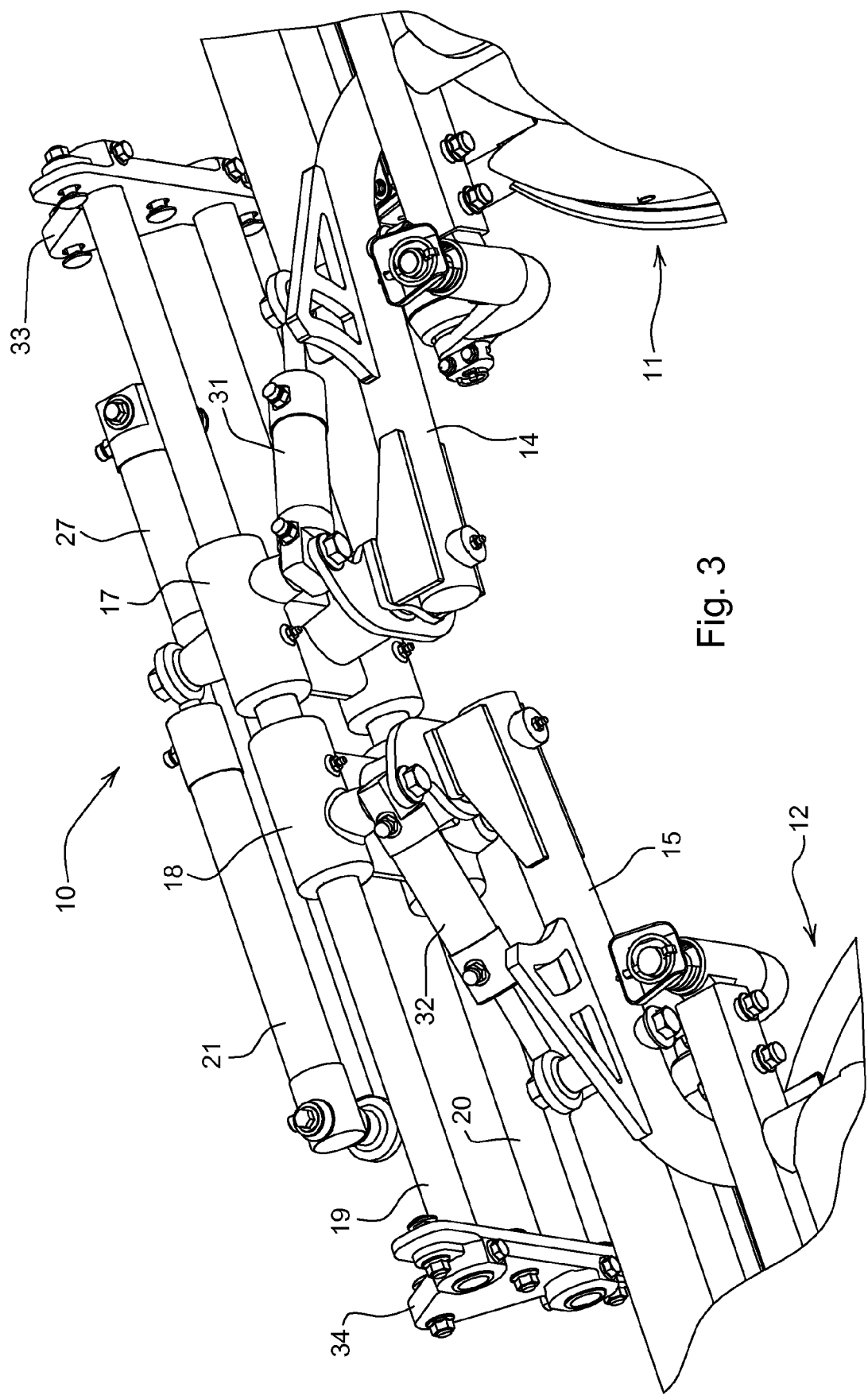
FIG. 3 a front perspective view of a shift mechanism for trim mower cutting units in a first embodiment of the invention.

As shown in FIGS. 1-3, in one embodiment of the invention, shift mechanism 10 may be provided on a self-propelled trim mower having three separate cutting units 11, 12, 13. For example, the self propelled trim mower may include a frame supported by left and right front drive wheels, a steerable rear wheel, an engine compartment arranged on a frame over and/or slightly forward of the rear wheel. The shift mechanism of the present invention, however, may be employed on various types and configurations of mowing vehicles other than trim mowers.

In one embodiment, cutting units 11, 12, 13 may be hydraulically or electrically powered. For example, as shown in FIGS. 1-3, each cutting unit may be a mower deck covering a rotary cutting blade. Alternatively, each cutting unit may be a reel-type cutting unit with a horizontally aligned reel that cuts the grass between a spiral blade and bedknife.

In one embodiment, shift mechanism 10 is used for two front cutting units 11, 12 pivotably mounted to lift arms 14, 15. Each of the front lift arms 14, is mounted to a separate slidable carrier 17, 18. Each slidable carrier 17, 18 can traverse laterally, relative to the trim mower, along parallel guide rods 19, 20. The ends of guide rods 19, 20 are mounted to the mower frame with brackets 33, 34. Rear cutting unit 13 may be pivotably attached by lift arm 16 to the frame of the trim mower.

In one embodiment, each slidable carrier 17, 18 may slide along the pair of guide rods 19, 20 to extend or retract a front lift arm 14, 15 and the attached front cutting unit to a lateral position relative to the trim mower. An extended lateral position may be preferred for hill side mowing or undulating ground, and/or provide optimal overlap between the front and rear cutting units. Each slidable carrier 17, 18 may position a front cutting unit at an outward offset position, relative to the trim mower, to allow mowing around obstacles on golf courses.

In one embodiment, shift mechanism 10 may include a pair of hydraulic cylinders 21, 22 referred to as extension cylinders. The first extension cylinder 21 may be attached to slidable carrier 17 by its rod end 23, and to a frame mounted bracket at its base end 24. The second extension cylinder 22 may be attached to slidable carrier 18 by its rod end 25, and to a frame mounted bracket at its base end 26. The two extension cylinders 21, 22 may be mounted laterally on the trim mower, with one over the other.

In one embodiment, shift mechanism 10 also may include a third hydraulic cylinder 27 referred to as the shifting cylinder. Shifting cylinder 27 may be mounted between the two extension cylinder bodies. The rod end 28 of the shifting cylinder may be attached to the body of extension cylinder 21, and the base end 29 of the shifting cylinder may be attached to extension cylinder 22. The shifting cylinder also may be oriented laterally with respect to the trim mower, and vertically in line between the extension cylinders.

In one embodiment of the invention, hydraulic lift cylinders 31, 32 may be mounted between slidable carriers 17, 18 and the respective lift arms to raise front cutting units 11, 12 into a transport position, or lower the front cutting units into a mowing position. Rear cutting unit 13 may be raised or lowered using hydraulic lift cylinder 35.

In one embodiment, to position front cutting units 11, 12 to provide maximum overlap and prevent uncut strips of grass, shifting cylinder 27 may be fully extended to pull slidable carriers 17, 18 to a center position relative to the trim mower. To position front cutting units 11, 12 for maximum productivity, shifting cylinder 27 may be fully retracted to move the slidable carriers equally outward laterally relative to the trim mower, to an extended position. To position one of the front cutting units further outward laterally from the trim mower (to reach the edge of an obstacle such as a sand trap, for example) than the other cutting unit, the extension cylinder for that cutting unit may be extended. The extension function may be controlled proportionally to allow the operator to extend the respective cutting unit to a desired distance outside of the trim mower's front tire, up to a maximum point.

Figure 4:
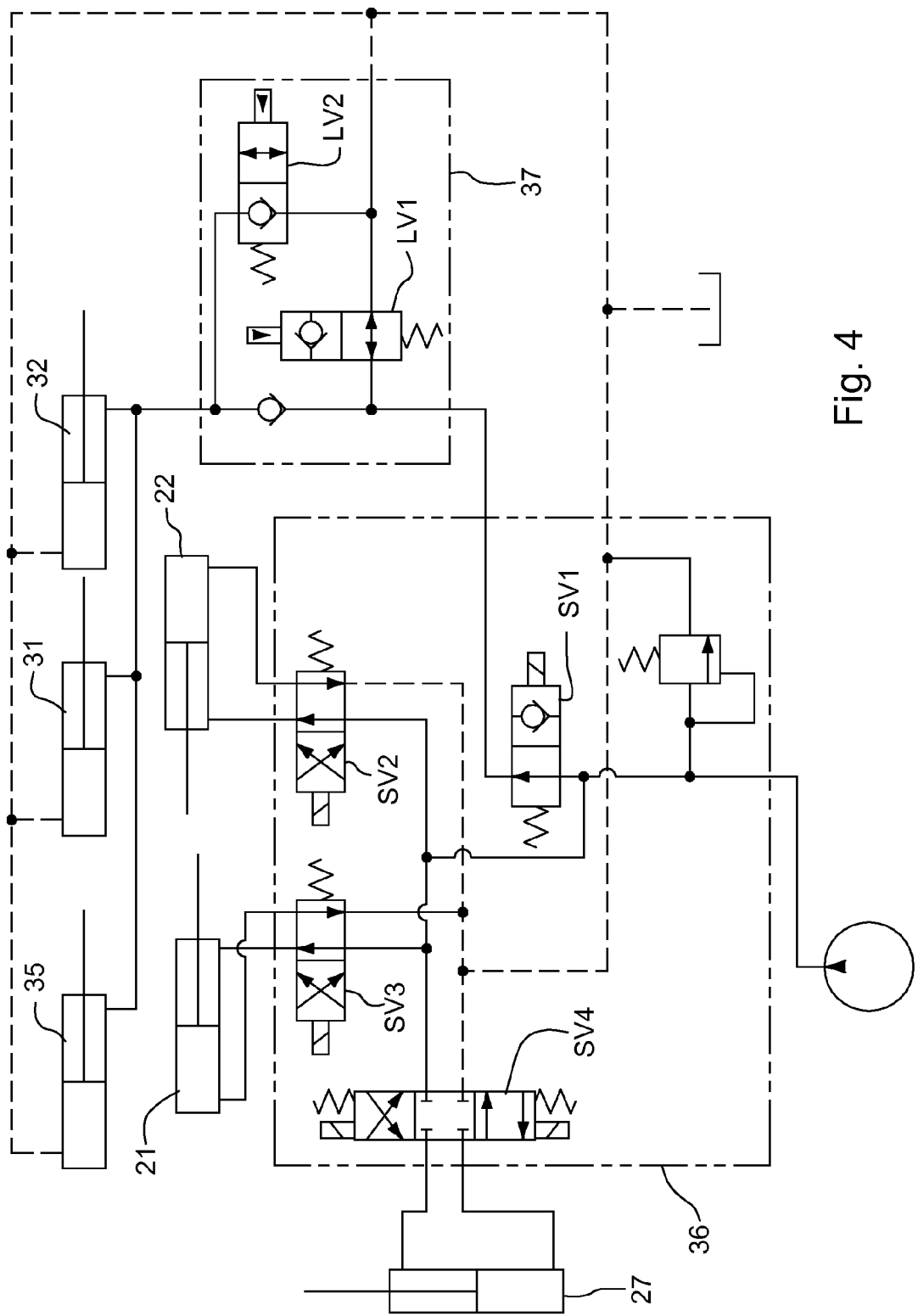
FIG. 4 is a schematic of a hydraulic system for the shift mechanism for trim mower cutting units in a first embodiment.

FIG. 4 shows an embodiment of a hydraulic circuit that may be used for shift mechanism 10. The hydraulic circuit includes shifting valve 36 with valves SV1-SV4, and lift valve 37 with valves LV1 and LV2. Shifting valve 36 may be an electro-hydraulic control valve 36 that independently controls movement of extension cylinders 21, 22 and shifting cylinder 27. Lift valve 37 may also be an electro-hydraulic control valve that controls movement of lifting cylinders 31, 32 and 35. Lift valve 37 may be hydraulically plumbed in series with shifting valve 36 so that hydraulic flow enters the shifting valve first, and exits the shifting valve before entering the lift valve.

In one embodiment, the hydraulic circuit of FIG. 4 prevents the operator from raising cutting units 11, 12 if they are in an extended position that could be unstable. When raising cutting units 11, 12, valve LV1 in lift valve 37 is activated to block flow through the valve. This shifting operation builds pressure in the hydraulic lines to the lift cylinders, and to the rod ends of the extension cylinders. It requires less pressure to retract an extension cylinder than it does to lift a cutting unit, so the extension cylinder will retract first and pull the respective cutting unit to its inward position. Once the extension cylinder is fully retracted, the cutting unit has reached its inward position, and the hydraulic pressure will continue to increase enough to raise all of the cutting units. The hydraulic circuit assures the cutting units will always be in a retracted position prior to raising them to a transport height.

In one embodiment, to operate the shifting function to move the cutting units into a maximum overlap or maximum productivity position, valve SV1 is activated to block flow through shifting valve 36 and build hydraulic pressure. SV4 of the shifting valve is then activated in one direction or the other to apply the built pressure to the shifting cylinder to move the cylinder into a fully retracted or fully extended position.

In one embodiment, to operate the cutting extension function, valve SV1 of the shifting valve is activated to block flow through the shifting valve and build hydraulic pressure. SV2 or SV3 of the shifting valve is then activated, depending on which cutting unit extension is desired, to direct the pressurized fluid to the base end of the cylinder. The pressurized fluid causes the respective extension cylinder to extend and move the cutting unit to an outward position. This extension may be controlled proportionally by activating or releasing a control input apparatus such as a lever or button.

The shift mechanism according to one embodiment of the invention allows a trim mower to cut rough or other confined areas on golf courses with cutting units that are remotely movable by the operator as needed, while minimizing any change of the center of gravity of the mower. The shift mechanism can maximize productivity of a mower by moving the cutting units into a position that can provide a maximum width of cut. The shift mechanism can reduce the chance of uncut strips due to crabbing during hillside mowing, by moving the cutting units to a maximum overlap position. The shift mechanism can also move the cutting units between the maximum overlap and maximum width of cut positions. The shift mechanism allows the operator to extend a cutting unit out to one side for trimming around obstacles or golf course hazards. The shift mechanism prevents raising the cutting units if they are extended laterally outwardly from the vehicle.

Having described the preferred embodiment, it will become apparent that various modifications can be made without departing from the scope of the invention as defined in the accompanying claims.

The invention claimed is:

1. A shift mechanism for trim mower cutting units comprising:
   a pair of extension cylinders attached to a pair of non-telescoping slidable carriers, each extension cylinder controlled independently by a first electro-hydraulic control valve to extend or retract one of the slidable carriers and a lift arm attached thereto;
   a pair of lifting cylinders controlled by a second electro-hydraulic control valve to raise and lower each lift arm; and
   a shifting cylinder attached between the extension cylinders and controlled independently to move both lift arms laterally inwardly or outwardly.

2. A shift mechanism for trim mower cutting units comprising:
   a pair of extension cylinders attached to a pair of non-telescoping slidable carriers, each extension cylinder controlled independently by a first electro-hydraulic control valve to extend or retract one of the slidable carriers and a lift arm attached thereto;
   a pair of lifting cylinders controlled by a second electro-hydraulic control valve to raise and lower each lift arm; and
   a hydraulic circuit that retracts the extension cylinders to move the lift arms laterally inwardly before actuating the lifting cylinders to raise a lift arm;
   wherein the hydraulic circuit includes a lifting valve in series with a shifting valve.

3. A shift mechanism for trim mower cutting units comprising:
   a pair of extension cylinders attached to a pair of non-telescoping slidable carriers, each extension cylinder controlled independently by a first electro-hydraulic control valve to extend or retract one of the slidable carriers and a lift arm attached thereto;
   a pair of lifting cylinders controlled by a second electro-hydraulic control valve to raise and lower each lift arm;
   wherein each slidable carrier slides on a pair of parallel guide rods mounted laterally with respect to the trim mower.

4. A shift mechanism for trim mower cutting units comprising:
   a pair of extension cylinders attached to a pair of non-telescoping slidable carriers, each extension cylinder controlled independently by a first electro-hydraulic control valve to extend or retract one of the slidable carriers and a lift arm attached thereto;
   a pair of lifting cylinders controlled by a second electro-hydraulic control valve to raise and lower each lift arm; and
   a third lifting cylinder to raise and lower a third lift arm.

* * * * *